United States Patent [19]

Yamauchi

[11] Patent Number: 4,835,648
[45] Date of Patent: May 30, 1989

[54] GAS INSULATED SWITCHGEAR

[75] Inventor: Takao Yamauchi, Amagasaki, Japan

[73] Assignee: Mitsubishi Denki Kabushiki Kaisha, Japan

[21] Appl. No.: 843,665

[22] Filed: Mar. 25, 1986

[30] Foreign Application Priority Data

Mar. 26, 1985 [JP] Japan .................................. 60-59590

[51] Int. Cl.$^4$ ............................................. H01H 33/54
[52] U.S. Cl. ........................................ 361/14; 361/115; 200/148 B
[58] Field of Search .................. 200/148 R, 148 B; 361/2, 14, 93, 115

[56] References Cited

U.S. PATENT DOCUMENTS

| | | | |
|---|---|---|---|
| 2,976,382 | 3/1961 | Lee | 361/14 |
| 3,430,016 | 2/1969 | Hurtle | 361/14 |
| 3,881,766 | 5/1975 | Pratsch | 361/115 |
| 4,275,431 | 6/1981 | Swoish et al. | 361/93 |
| 4,527,029 | 7/1985 | Brockmann et al. | 361/115 X |
| 4,528,437 | 7/1985 | Burnett et al. | 361/2 X |
| 4,687,890 | 8/1987 | Yamamoto et al. | 200/148 |
| 4,695,913 | 9/1987 | Terracol et al. | 361/2 |

FOREIGN PATENT DOCUMENTS

| | | |
|---|---|---|
| 1210847 | 2/1986 | Canada . |
| 0094871 | 11/1983 | European Pat. Off. . |
| 1121097 | 7/1956 | France . |
| 53-160724 | 12/1978 | Japan . |
| 820711 | 9/1959 | United Kingdom . |

*Primary Examiner*—A. D. Pellinen
*Assistant Examiner*—Jeffrey A. Gaffin
*Attorney, Agent, or Firm*—Leydig, Voit & Mayer

[57] ABSTRACT

A gas insulated switchgear includes a hermetic vessel for containing therein a switching apparatus and an electrically insulating gas for insulating the switching apparatus. An electric arc detector disposed on the hermetic vessel detects an electric arc generated within the hermetic vessel and generates a signal upon detecting the arc. A control circuit prevents a trip signal from being supplied to one circuit interrupter in response to an arc signal and a trip signal for another circuit interrupter.

4 Claims, 1 Drawing Sheet

GAS INSULATED SWITCHGEAR

BACKGROUND OF THE INVENTION

This invention relates to a gas insulated switchgear.

In a conventional gas insulated switchgear, a system utilizing a current transformer is used for protecting the switchgear against grounding and short-circuiting. That is, the system may have a group of interrupters, for example, in the region to be protected which are opened when the difference between the current flowing into the region to be protected and the current flowing out from the region to be protected exceeds a predetermined value.

FIG. 1 is a schematic electrical connection diagram showing a conventional protective system. The illustrated system includes two bus conductors 2 and 3 between which four electrical paths each including two series connected disconnectors 4 are connected. The junction between the two disconnectors 4 of each parallel electrical path is connected to an electrical series circuit each including a circuit interrupter 1 and a disconnector 5. A pair of current transformers 6 and 7 are disposed at both sides of the circuit interrupter 1. The illustrated system is connected to load circuits through respective terminals 8. For example, the load circuit may comprise a power cable 40 extending from a terminal 8 and connected to a bus 19 via a cable head 14, a disconnector 15, a current transformer 17a, a circuit interrupter 16, a second current transformer 17b, and a second disconnector 18. The system also comprises a series circuit connected across the bus conductors 2 and 3 and including a circuit interrupter 9 and a current transformer 10 and a disconnector 11 on the one side and a current transformer 12 and a disconnector 13 on the other side.

When the region to be protected is assumed to be interrupters, current transformers 6 and 7 as well as 10 and 12 are disposed on the both sides of interrupters 1, 9 and arranged to detect the fact that a grounding or a short-circuit condition occurs on either side of the bus conductors 2 and 3, whereby the interrupters 1 associated with the line to be isolated are opened.

With the above conventional gas insulated switchgear, grounding or the like cannot be detected unless it is an electric current higher than a predetermined level due to the errors in the current transformer, and since the grounding or the like is detected by a current, erroneous operation or inoperation may occur, leading to a problem of low reliability.

SUMMARY OF THE INVENTION

Accordingly, an object of the present invention is to provide a gas insulated switchgear in which the above problem of the conventional gas insulated switchgear is resolved.

Another object of the present invention is to provide a gas insulated switchgear comprising a highly reliable protective device which reliably detects grounding or the like and is free from erroneous operation or inoperation.

Accordingly, the present invention provides an arrangement for protecting a region of an electrical system, the arrangement comprising at least first and second circuit interrupters, a fault current detector, and a controller. The first and second interrupters include first and second trip mechanisms for opening the first and second circuit interrupters in response to first and second trip signals, respectively. The first circuit interrupter further includes a switching apparatus, a hermetic vessel hermetically enclosing the switching apparatus, and an electric arc detector disposed on the hermetic vessel for detecting an electric arc generated within the hermetic vessel and for generating an arc signal in response to the detection of an electric arc. The fault detector detects a fault current flowing through the region and generates the first trip signal. The controller generates the second trip signal in response to the presence of the arc signal and the absence of the first trip signal and does not generate the second trip signal in response to the presence of the arc signal and the presence of the first trip signal.

The gas insulated switchgear according to the present invention detects an electric arc generated within a switchgear vessel and comprises a control circuit which provides a detection signal for activating isolating means to isolate the switchgear from the electric circuit switchgear and to maintain the isolating means in the inactivated state during the normal operation of the switchgear.

According to the present invention, when the switchgear is not in operation, the isolating means activates when the generation of an arc is detected, but when the switchgear is in operation, the isolating means is locked and the switchgear is not isolated even when an arc is generated during the switching operation of the switchgear.

BRIEF DESCRIPTION OF THE DRAWINGS

The present invention will become more readily apparent from the following detailed description of the preferred embodiment of the invention taken in conjunction with the accompanying drawings, in which.

DETAILED DESCRIPTION OF THE PREFERRED EMBODIMENT

Figure 2:
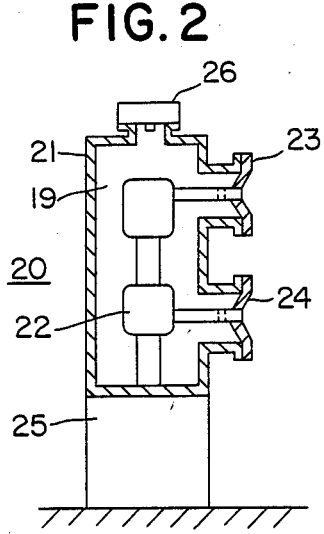
FIG. 2 is a vertical sectional view of one of the circuit interrupters used in the gas insulated switchgear of the present invention.
Figure 3:
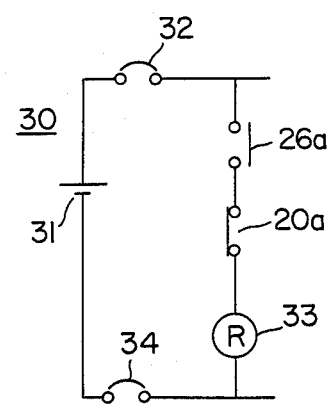
FIG. 3 is an electrical connection diagram of the control circuit of the gas insulated switchgear of the present invention.

FIGS. 2 and 3 schematically illustrate one of the circuit interrupters employed in the gas insulated switchgear of the present invention. The illustrated circuit interrupter 20 comprises a hermetic vessel 21 within which an electrically insulating gas 19 is disposed. The vessel also contains therein a stationary and movable contacts assembly 22 electrically connected to an external circuit (not shown) through flange portions 23 and 24. The contact assembly 22 is mechanically connected to an operating mechanism 25 to be operated to open and close the contacts of the contact assembly 22 in response to the trip command. According to the present invention, the circuit interrupter 20 comprises an arc detector 26 for detecting an electric arc generated within the vessel 21 of the circuit interrupter 20. The arc detector 26 may detect light emitted from the electric arc. Alternatively, the arc detector 26 may be a detector for detecting vibration of the vessel 21 or change in gas pressure within the vessel 21.

A control circuit 30 shown in FIG. 3 is a series circuit comprising an electrical power source 31, an air circuit interrupter 32, a contact 26a of the arc detector 26, a contact 20a of the circuit interrupter 20, a relay 33 and an air circuit interrupter 34. The contact 26a is a normally open contact and is closed when the arc detector 26 detects the generation of an arc. The contact 20a is a normally closed contact which is opened when the operating mechanism 25 of the circuit interrupter 20 makes the contact opening movement. The relay 33 is connected to a predetermined circuit interrupter which must be trip opened, when an arc is generated within the vessel of the circuit interrupter, to protect the circuit interrupter in which the arc is generated. The air circuit interrupters 32 and 34 are normally closed.

When a ground fault or a short circuit fault occurs on the load side line in the electrical power system employing the gas insulated switchgear of the present invention, some of the current transformers 6, 7 10 and 12 detect the abnormal current condition on the line on which the fault occurs. Then the predetermined circuit interrupter in the system which contributes to the protection of the line from the fault is opened by a trip signal supplied in response to the detection of the electric arc, thereby isolating and protecting the faulted line from the remaining circuit. This protective operation is identical to that of the conventional gas insulated switchgear.

When some of the circuit interrupters which interrupt the fault current are opened, an electric arc is generated between the separated contacts within the hermetic vessel. This arc is detected by the arc detector 26 and the contact 26a of the control circuit 30 shown in FIG. 3 is closed. In order not to activate the control circuit 30 under this condition, the operating mechanism 25 of the circuit interrupter 20 is connected to the normally closed contact 20a of the control circuit 30 so that the contact 20a is opened when the operating mechanism 25 is making a contact opening motion. When the contact 20a is opened, the relay 33 of the control circuit 30 is not energized by the electric source 31 and the control circuit 30 is not activated even when the contact 26a is closed by the arc signal from the arc detector 26.

Figure 1:
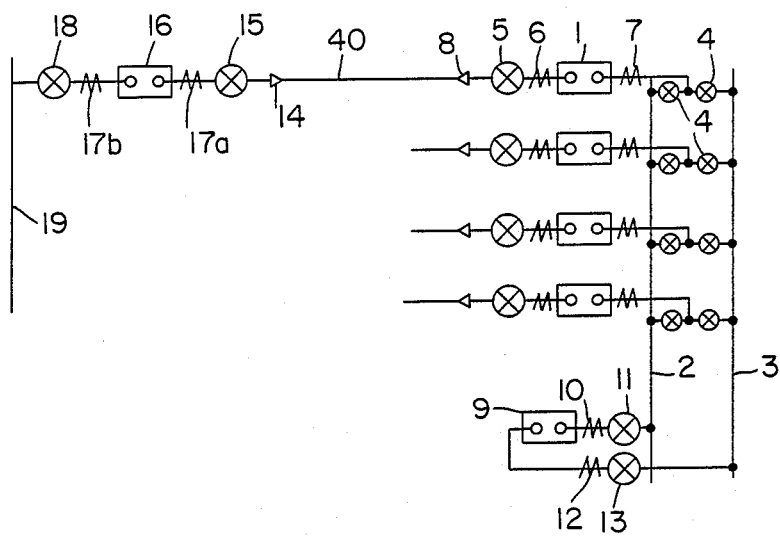
FIG. 1 is a partial electrical connection diagram of a conventional gas insulated switchgear.

It sometimes occurs that an electric arc is generated within an outer housing or a hermetic vessel of the switchgear such as the vessel 21 of the circuit interrupter 20. According to the present invention, such an electric arc generated within a hermetic vessel, for example the vessel 21 of the circuit interrupter 20, is detected by an arc detector associated with the vessel within which the arc is generated, such as the arc detector 26 for the circuit interrupter 20. The arc detector supplies an arc signal, which represents that an electric arc is generated within the vessel 21, to the normally open contact 26a of the control circuit 30 shown in FIG. 3 to close it. Since other contacts are closed at this time, the relay 33 is energized by the electric source 31 to supply a trip command to an un-illustrated circuit interrupter which contributes to the isolation of the faulted circuit interrupter 20 from the source side circuit to protect the circuit interrupter 20 in which the arc is generated. For example, if a ground-fault arc is generated within the circuit interrupter 1 shown at the top of FIG. 1, the contact 26a closes and the relay 33 is operated. The control circuit 30 may then activate the circuit interrupter 9 and the circuit interrupter 16, isolating the faulted circuit interrupter 1.

During this operation, the operating mechanism 25 of the faulted circuit interrupter 20 in which the arc is generated does not make any motion, so that the normally closed contact 20a of the control circuit 30 is not opened and the control circuit 30 is not inactivated.

As apparent from the foregoing description, the control device for isolating the faulted region such as a circuit interrupter by providing a trip signal to the circuit interrupter effective to the protection of the faulted region is activated by an arc signal from the arc detector which detects the arc within the hermetic vessel. During normal fault current interruption by the circuit interrupter, the control circuit is inactivated by the contact opening motion of the operating mechanism of the circuit interrupter. Therefore, the reliability in protecting various components in the gas insulated switchgear is increased and the cost can also be lowered.

What is claimed is:

1. An arrangement for protecting a region of an electrical system comprising:
    at least first and second circuit interrupters including first and second trip means for opening said first and second circuit interrupters in response to first and second trip signals, respectively, said first circuit interrupter further including a switching apparatus, a hermetic vessel hermetically enclosing said switching apparatus, and an electric arc detecting means disposed on said hermetic vessel for detecting an electric arc generated within said hermetic vessel and generating an arc signal in response to the detection of an electric arc;
    fault current detecting means for detecting a fault current flowing through the region and generating said first trip signal; and
    control means for generating said second trip signal in response to said arc signal and the absence of said first trip signal and for not generating said second trip signal in response to said arc signal and said first trip signal.

2. The arrangement of claim 1 wherein the electric arc detecting means includes means for detecting light emitted by an arc.

3. The arrangement of claim 1 wherein the electric arc detecting means includes means for detecting vibration of the vessel due to an arc.

4. The arrangement of claim 1 wherein the electric arc detecting means includes means for detecting a change in gas pressure within the vessel due to an arc.

* * * * *